United States Patent
Wang et al.

(10) Patent No.: US 9,501,205 B2
(45) Date of Patent: *Nov. 22, 2016

(54) NATURE INSPIRED INTERACTION PARADIGM

(71) Applicant: SAP SE, Walldorf (DE)

(72) Inventors: Xiao Wang, Mountain View, CA (US); Bingjun Zhou, Mountain View, CA (US); Philipp Maximilian Wesel, Ettlingen (DE); Vishal Sikka, Los Altos, CA (US); Sanjay Rajagopalan, Palo Alto, CA (US); Xiaoqi Ouyang, Foster City, CA (US); Janaki Kumar, Palo Alto, CA (US); Tao Liu, Sunnyvale, CA (US); Jun Zhu, Mountain View, CA (US)

(73) Assignee: SAP SE, Walldorf (DE)

( * ) Notice: Subject to any disclaimer, the term of this patent is extended or adjusted under 35 U.S.C. 154(b) by 266 days.

This patent is subject to a terminal disclaimer.

(21) Appl. No.: 14/108,050

(22) Filed: Dec. 16, 2013

(65) Prior Publication Data

US 2015/0169179 A1 Jun. 18, 2015

(51) Int. Cl.
*G06F 3/0481* (2013.01)
*G06F 17/30* (2006.01)
*G06F 3/0486* (2013.01)
*G06F 3/0488* (2013.01)
*G06Q 10/06* (2012.01)

(52) U.S. Cl.
CPC ......... *G06F 3/04817* (2013.01); *G06F 3/0486* (2013.01); *G06F 3/04883* (2013.01); *G06F 17/30* (2013.01); *G06Q 10/06393* (2013.01)

(58) Field of Classification Search
CPC .................................................. G06F 3/04817
USPC .......................................................... 715/835
See application file for complete search history.

(56) References Cited

U.S. PATENT DOCUMENTS

| | | | |
|---|---|---|---|
| 5,394,521 A * | 2/1995 | Henderson, Jr. ...... | G06F 3/0481 715/788 |
| 5,886,698 A | 3/1999 | Sciammarella | |
| 6,211,876 B1 * | 4/2001 | Ackermann ...... | G06F 17/30675 704/239 |
| 6,237,006 B1 * | 5/2001 | Weinberg ................ | G06F 11/32 345/419 |
| 6,639,614 B1 * | 10/2003 | Kosslyn ................ | G06T 11/206 345/440 |

(Continued)

OTHER PUBLICATIONS iPhoneDownloadBlog, "Using Spotlight Search on the iPhone", available at <https://www.youtube.com/watch?v=lz1G3LDSt0Q>, available on Jan. 3, 2011, 5 pages.

*Primary Examiner* — Reza Nabi
*Assistant Examiner* — Daniel Rodriguez
(74) *Attorney, Agent, or Firm* — Fountainhead Law Group P.C.

(57) ABSTRACT

A system is described for providing a virtual environment corresponding to a scene from nature. The virtual environment can be used to present performance metrics to a user. In some examples, the virtual environment can be a pond where performance metrics are represented using lily pads. The visual appearance of the lily pad can be dependent on metadata of the corresponding performance metric and the lily pads can be grouped according to how the performance metrics are grouped in the database.

15 Claims, 8 Drawing Sheets

(56) References Cited

U.S. PATENT DOCUMENTS

| | | | |
|---|---|---|---|
| 6,792,595 B1* | 9/2004 | Storistenau | G06F 8/33 345/650 |
| 6,842,176 B2 | 1/2005 | Sang'udi et al. | |
| 7,774,745 B2 | 8/2010 | Fildebrandt et al. | |
| 7,831,582 B1* | 11/2010 | Scofield | G06F 17/30864 707/706 |
| 7,840,935 B2 | 11/2010 | Fildebrandt et al. | |
| 8,150,101 B2 | 4/2012 | Haanpaa et al. | |
| 8,161,087 B2 | 4/2012 | Latzina | |
| 8,196,047 B2 | 6/2012 | Fisher et al. | |
| 8,312,039 B2 | 11/2012 | Gilula | |
| 8,489,569 B2 | 7/2013 | Kirk et al. | |
| 8,502,823 B2 | 8/2013 | Moreno | |
| 8,533,619 B2 | 9/2013 | Baier et al. | |
| 8,612,806 B2 | 12/2013 | Rossi | |
| 8,935,245 B1* | 1/2015 | Cionca | G06F 17/30554 707/732 |
| 8,972,879 B2* | 3/2015 | Migos | G06F 3/04845 715/702 |
| 2001/0034742 A1* | 10/2001 | Stinson | G06F 3/0481 715/202 |
| 2002/0033848 A1* | 3/2002 | Sciammarella | G06F 3/0481 715/838 |
| 2002/0174121 A1* | 11/2002 | Clemie | G06F 3/04815 |
| 2006/0101347 A1* | 5/2006 | Runov | G06F 17/30067 715/764 |
| 2007/0011146 A1* | 1/2007 | Holbrook | G06Q 30/0603 |
| 2007/0288498 A1 | 12/2007 | Dietz et al. | |
| 2008/0092121 A1* | 4/2008 | DeRose | G06F 11/3409 717/125 |
| 2008/0098332 A1* | 4/2008 | LaFrance-Linden | H04L 41/0893 715/846 |
| 2009/0094197 A1* | 4/2009 | Fein | G06F 17/3005 |
| 2009/0158196 A1* | 6/2009 | Crystal | G06F 17/30572 715/780 |
| 2010/0037203 A1* | 2/2010 | Limburn | G06F 8/33 717/105 |
| 2010/0049566 A1* | 2/2010 | Fukuoka | G06Q 10/06395 705/7.41 |
| 2010/0149132 A1* | 6/2010 | Iwase | G06F 1/1626 345/175 |
| 2010/0299201 A1* | 11/2010 | Thrasher | G06F 17/30648 705/14.49 |
| 2011/0138340 A1* | 6/2011 | Holm-Petersen | G06Q 10/06 715/854 |
| 2011/0173264 A1* | 7/2011 | Kelly | G06Q 10/10 709/205 |
| 2011/0196864 A1* | 8/2011 | Mason | G06F 3/0416 707/728 |
| 2011/0202853 A1* | 8/2011 | Mujkic | H04L 12/5815 715/753 |
| 2012/0047130 A1 | 2/2012 | Perez et al. | |
| 2012/0096390 A1* | 4/2012 | Kwahk | G06F 3/0488 715/779 |
| 2012/0174011 A1 | 7/2012 | Cabrera-Cordon | |
| 2012/0192048 A1* | 7/2012 | Suzuki | G06Q 30/00 715/205 |
| 2012/0209878 A1 | 8/2012 | Park et al. | |
| 2012/0290950 A1* | 11/2012 | Rapaport | H04L 51/32 715/753 |
| 2012/0290977 A1* | 11/2012 | Devecka | H04W 4/206 715/810 |
| 2013/0019193 A1* | 1/2013 | Rhee | G06F 3/0486 715/769 |
| 2013/0024760 A1 | 1/2013 | Vogel et al. | |
| 2013/0167082 A1* | 6/2013 | Joo | G06F 3/0488 715/810 |
| 2013/0167088 A1* | 6/2013 | Mangum | G06F 3/0488 715/815 |
| 2013/0212526 A1* | 8/2013 | Park | G06F 9/4443 715/808 |
| 2013/0232263 A1* | 9/2013 | Kelly | H04L 43/10 709/224 |
| 2013/0247030 A1* | 9/2013 | Kay | H04L 67/34 717/178 |
| 2013/0247044 A1* | 9/2013 | Bingham | G06F 9/45533 718/1 |
| 2013/0297588 A1 | 11/2013 | Tyagi | |
| 2014/0080600 A1* | 3/2014 | Knutsson | A63F 13/12 463/31 |
| 2014/0089090 A1* | 3/2014 | Thrasher | G06F 17/30864 705/14.54 |
| 2014/0143695 A1* | 5/2014 | Sundermeyer | H04L 41/22 715/765 |
| 2014/0280056 A1 | 9/2014 | Kelly | |
| 2014/0320500 A1* | 10/2014 | Fletcher | G09G 5/36 345/440 |
| 2014/0320502 A1* | 10/2014 | Fletcher | G06T 11/206 345/440.2 |
| 2014/0325058 A1* | 10/2014 | Fletcher | H04L 43/045 709/224 |
| 2014/0325363 A1* | 10/2014 | Fletcher | G06F 9/45533 715/736 |
| 2014/0380214 A1 | 12/2014 | Huang | |
| 2015/0058796 A1* | 2/2015 | Thakur | G06F 3/04883 715/800 |
| 2015/0089366 A1* | 3/2015 | Beckett | G06F 3/0484 715/716 |

* cited by examiner

NATURE INSPIRED INTERACTION PARADIGM

BACKGROUND

In the digital age, business executives have access to a plethora of business data that they did not have in the past. This business data is analyzed to create key performance indicators (KPIs) which provide valuable insight on the performance of various parts of the company. Business executives often monitor these KPIs throughout the day and draw valuable insights from these KPIs to make critical business decisions. Exemplary KPIs include the number of defects in every 100 items or customer satisfaction.

While this business data is a valuable resource to business executives, the amount of information available can be overwhelming. It can be difficult to monitor this constant flow of changing data. Management information systems have been created to provide a snapshot of the businesses performance however these systems typically have shortcomings. First of all, the snapshots provided are often so densely populated with data that it can be difficult to extract insightful conclusions from them. Moreover, simultaneously presenting multiple charts of different types can be difficult to read. Lastly, the systems are typically tailored for a specific demographic and thus do not translate well across different cultures. As a result, they are not universal and require a learning curve for some users. For example, the color red represents a positive gain in the Shanghai stock market but represents a negative loss in the New York stock market.

SUMMARY

In one embodiment, a computer-implemented method provides, by a processor, a virtual environment having a visual appearance corresponding to a scene from nature. The method then provides, by the processor, a collection of icons within the virtual environment that represent the collection of data, the collection of icons including a plurality of icons that represent a plurality of performance metrics derived from the collection of data and a group icon, wherein the plurality of icons cluster around the group icon. The method then receives, by the processor, a first input. The method then displays, by the processor, a value representing a performance metric on top of an icon from the plurality of icons that corresponds with the performance metric in response to receiving the first input.

In another embodiment, a non-transitory computer readable storage medium stores one or more programs comprising instructions providing a virtual environment having a visual appearance corresponding to a scene from nature, providing a collection of icons within the virtual environment that represent the collection of data, the collection of icons including a plurality of icons that represent a plurality of performance metrics derived from the collection of data and a group icon, wherein the plurality of icons cluster around the group icon, receiving a first input, and displaying a value representing a performance metric on top of an icon from the plurality of icons that corresponds with the performance metric in response to receiving the first input.

In another embodiment, a computer implemented system comprises one or more computer processors and a non-transitory computer-readable storage medium. The non-transitory computer-readable storage medium comprises instructions, that when executed, control the one or more computer processors to be configured for providing a virtual environment having a visual appearance corresponding to a scene from nature, providing a collection of icons within the virtual environment that represent the collection of data, the collection of icons including a plurality of icons that represent a plurality of performance metrics derived from the collection of data and a group icon, wherein the plurality of icons cluster around the group icon, receiving a first input, and displaying a value representing a performance metric on top of an icon from the plurality of icons that corresponds with the performance metric in response to receiving the first input.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments described herein provide a graphical user interface for viewing business data associated with an organization. A touch display can present business data for consumption by the user. In some examples, the touch display can be part of an electronic device, such as a tabletop device. A tabletop device is an electronic device with a touch display in a horizontal orientation similar to a tabletop. A user looks down at the tabletop device to view performance metrics used for evaluating the business data. The electronic device can receive user inputs in the form of touch gestures on the touch display to control the graphical representation of the business data. In some examples, other types of data besides business data can be graphically presented but for purposes of simplicity, the examples and embodiments here will be directed towards business data.

In some embodiments, the business data is graphically presented as part of a virtual environment corresponding to a scene from nature. Nature elements in the nature scene can represent business data. Since nature scenes are often found to be peaceful, the graphical presentation of business data as part of a nature scene can be both informative and also soothing, appealing, and/or interesting to the viewer. Moreover, nature elements are universally understood and have a timeless appeal since they appear substantially the same throughout space and time. For instance, a healthy 1960's water lily from the United States appears substantially the same as a healthy 2010's water lily from Europe. Similarly, a chicken from South America appears substantially the same as a chicken from Asia. This timeless quality that is inherently present in elements from nature allows the virtual environment to be easily understood by users from diverse cultures and demographics while also transcending time. In some examples, the business data can belong to an enterprise environment.

Figure 1:
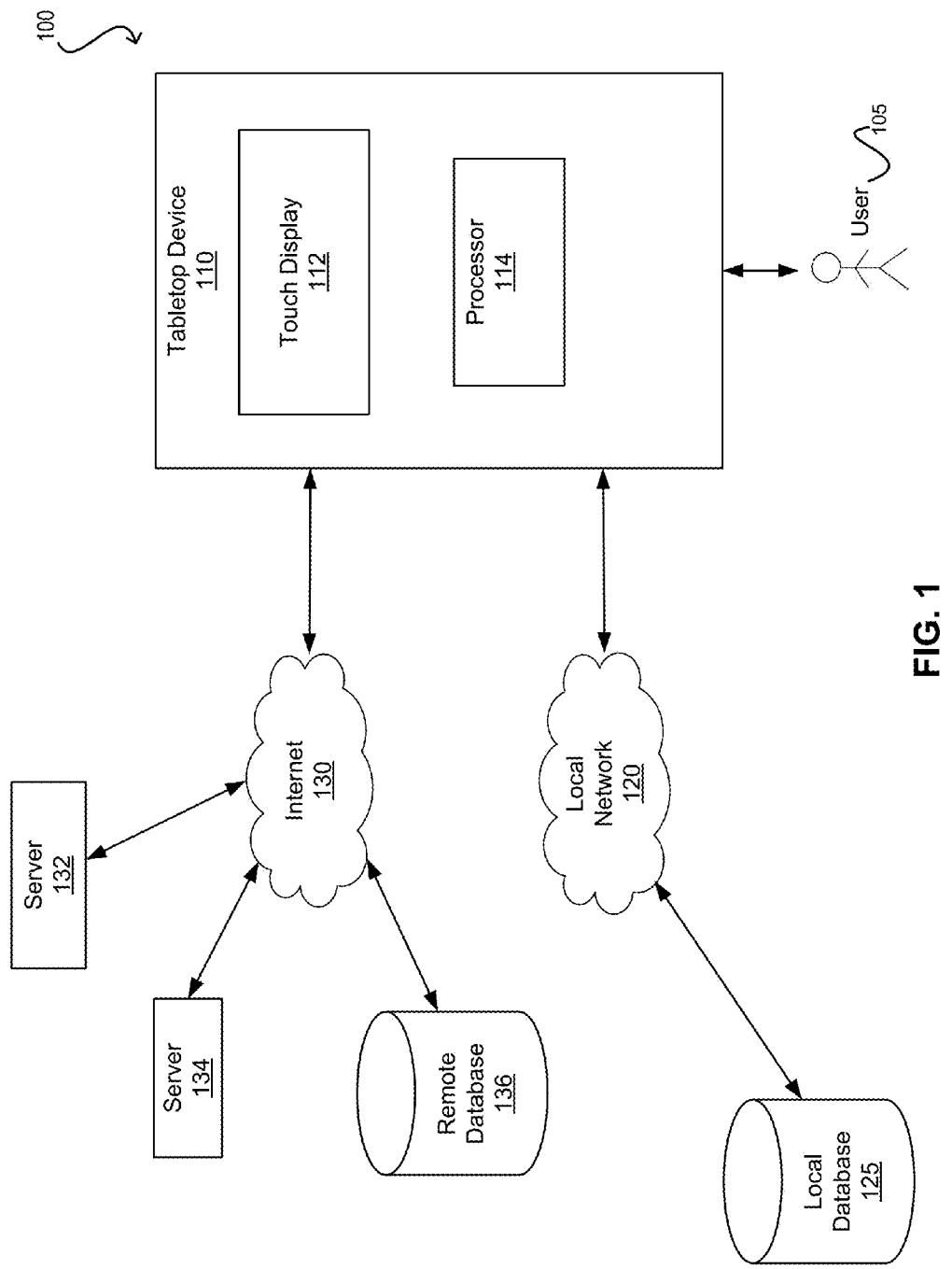
FIG. 1 illustrates a system according to one embodiment.

FIG. 1 illustrates system 100 according to one embodiment. System 100 includes tabletop device 110 however in other embodiments, tabletop device 110 can be any electronic device that is configured to graphically present data for consumption by user 105. This can include desktop computers, laptops, and handheld electronic devices. Tabletop device 110 includes touch display 112 and processor 114. Processor 114 is configured to process business data and generate a virtual environment to be displayed on touch display 112. In some embodiments, a dedicated data processor can process business data while a graphics processor generates the virtual environment in which the business data is graphically presented in. In some examples, touch display 112 can be a traditional display and user inputs can be received from some other types of user interface. For instance, peripheral devices such as a mouse or a touchpad can be used.

Tabletop device 110 can be configured to communicate with local network 120 to access business data in local database 125. The local business data can include private business data describing the performance of the organization. For example, the private business data can include attrition data, survey data, sales data, profits data, company news, and business expenses data. Private business data can have privacy considerations and thus is stored in the local network. Processor 114 can retrieve the local business data or performance metrics such as key performance indicators (KPIs) from the private business data. KPIs provide a simple way to evaluate the success of parts of the organization. The KPIs can be derived from the private business data or can be retrieved. In one example, user 105 can draw insights from KPIs and make important business decisions based on the insights.

Tabletop device 110 is also configured to communicate with internet 130 to access remote data from server 132, server 134, or remote database 136. Remote data can include business data that is publically available or provided by third party sources. For example, remote data can include news, stock market quotes, and search query results. Processor 114 can retrieve remote data from these remote sources. In one example, the remote data is search results. The search results can be presented in the virtual environment using elements of nature. In another example, the remote data is business data associated with the organization. The business data can be evaluated to generate performance metrics which can be graphically presented in the virtual environment using elements of nature that are frequently found in the nature scene.

Figure 2:
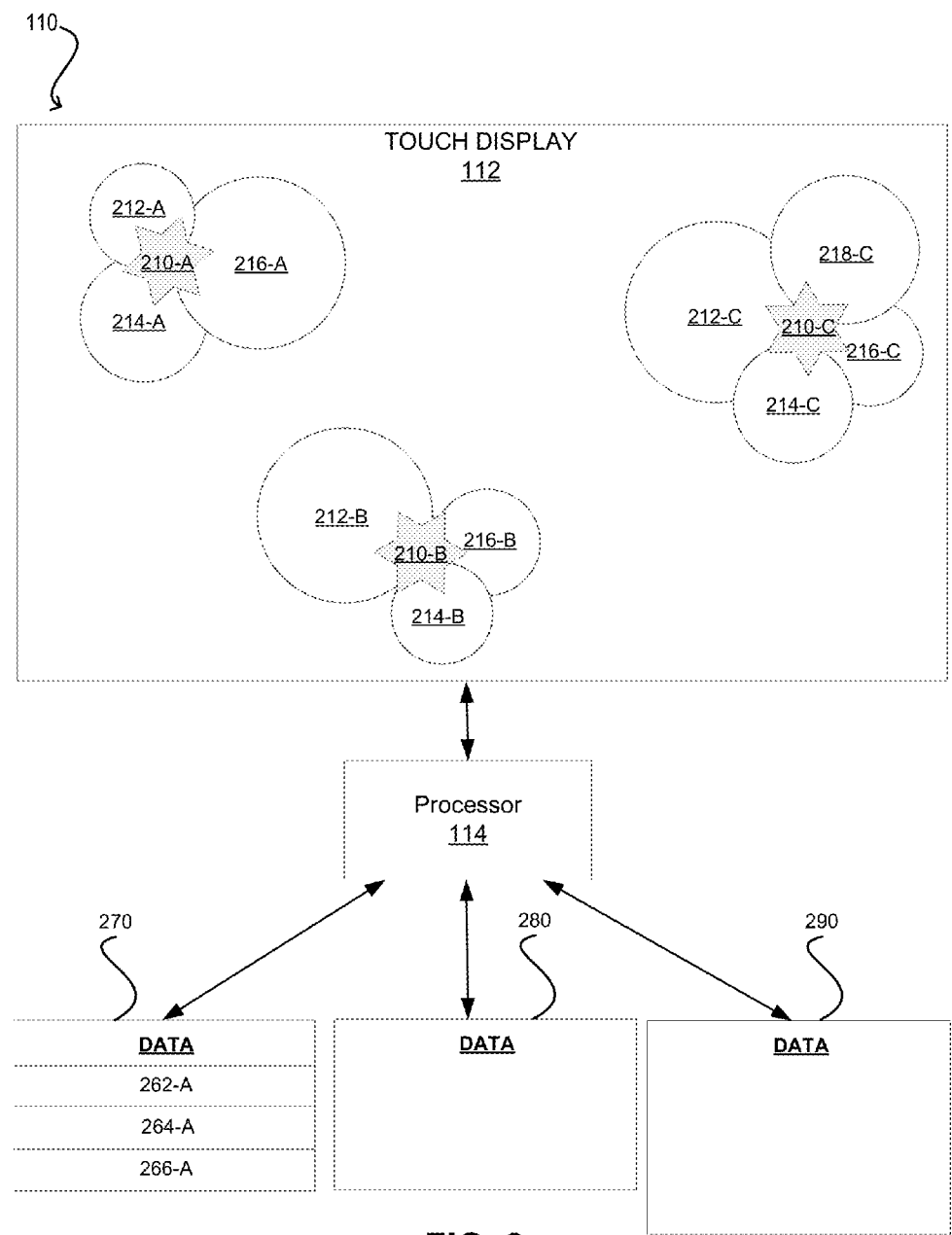
FIG. 2 illustrates a tabletop device according to one embodiment.

FIG. 2 illustrates tabletop device 110 according to one embodiment. As shown, tabletop device 110 includes touch display 112 and processor 114. Processor 114 processes business data from charts 270, 280, and 290 to create nature elements that are presented as part of the virtual environment displayed in touch display 112. Charts 270, 280, and 290 can belong to the same table or the same database. Alternatively, charts 270, 280, and 290 can be from different tables, data sources (local versus remote), and/or databases. Touch display 112 can display a virtual environment corresponding to a nature scene such as a pond. Nature elements in the pond, which can include water lilies, lily pads, fireflies, water insects, and fish, can represent the processed business data. Each type of nature element can serve a specific purpose in the virtual environment. In some examples, processor 114 can generate the pond first and subsequently populate nature elements into the pond based on received business data. The business data received can be specified by user 105 through touch display 112 or some other user interface. In other embodiments, the virtual environment can resemble other nature scenes such as ocean, a lake, a stream, and a forest. In these nature scenes, the processed business data would be represented using nature elements that are frequently found in the selected nature scene.

Here, processor 114 processes received data 262-A to generate a KPI. The KPI is a value for user 105 to evaluate data 262-A. In one example, the KPI can be generated by performing a statistical operation on data 262-A. In another example, the KPI can simply be the most recent entry in data 262-A. In yet another example, the KPI can be preprocessed and stored as a value in data 262-A. A KPI can also be determined for data 264-A and 266-A. In some embodiments, other forms of performance metrics can be generated instead of a KPI.

Processor 114 can generate an icon for each KPI. The icons, which can be elements that are naturally found in the virtual environment, can all be of the same type for each KPI. For instance, all KPIs can be graphically represented by a lily pad icon. In other examples, processor 114 can generate different nature elements for a KPI. This can depend on the chart which the KPI belongs to. For instance, processor 114 can generate an icon of a first type of water plant for KPIs from chart 280 and an icon of a second type of water plant for KPIs from chart 290. Alternatively, processor 114 can generate lily pad icons for KPIs from charts 280 and 290. Lily pad icons that correspond to different charts can include a distinct feature to visually distinguish themselves from other charts. For instance, lily pad icons for KPIs from chart 280 can have a single notch around the perimeter while lily pad icons for KPIs from chart 290 have two notches around the perimeter. This allows user 105 to distinguish the two charts by looking at the number of notches in the lily pad icons. In other embodiments, other elements that naturally appear in a pond can be generated to represent each KPI.

Processor 114 can also generate a group icon for each chart. The group icon can be an element that is naturally found in the virtual environment. In the pond virtual environment where KPIs are graphically represented by lily pad icons, a chart associated with the KPIs can be graphically represented by a water lily icon since a water lily appears in nature along with lily pads. In other examples, other nature elements that are closely related to the nature element representing the KPI can be used. By using lily pads and water lilies, this graphical representation of charts and KPIs have a timeless feature that would transcend space and time. Here, processor 114 generates water lily icon 210-A to graphically represent group 270. Processor 114 can cluster lily pad icons that represent data in group 270 (e.g., lily pad icons 212-A, 214-A, and 216-A) around water lily icon 210-A to provide a visual indication that the lily pads are generated from data within chart 270. Together, group icon 210-A and lily pad icons 212-A, 214-A, 216-A form a collection of icons that represent chart 270.

Processor 114 processes chart 280 in a similar fashion as chart 270, thus generating lily pad icons 212-B, 214-B, and 216-B that cluster around water lily icon 210-B. Together, water lily icon 210-B and lily pad icons 212-B, 214-B, and 216-B form a collection of icons that represent chart 270. Processor 114 also processes chart 290 to generate lily pad icons 212-C, 214-C, 216-C, 218-C which are clustered around water lily icon 210-C (forming another collection of icons). In some examples, water lily icons 210-A, 210-B, and 210-C can be visually represented as different species of water lilies. By using different species, user 105 can easily identify one grouping of lily pads from another grouping of lily pads in the virtual environment. For example, water lily icon 210-A can be a water lily with five pedals, water lily icon 210-B can be a water lily with six pedals, and water lily icon 210-C can be a water lily with eight pedals. In some embodiments, processor 114 can generate the lily pads and water lilies with a textual identifier to identify the source of a lily pad or water lily. The textual identifier can be turned on and off from user input. In other embodiments, dragging a water lily icon on touch display 112 can move the water lily along with the clustered lily pads to another location on touch display 112. In yet other embodiments, the business data and groupings of business data can be graphically represented using other elements that naturally appear in the virtual environment.

User 105 can specify the business data that is to be evaluated on touch display 112. User 105 can select business data from local database 125 and remote data from server 132 or remote database 136 to be presented in a virtual environment on touch display 112. Collections of icons that represent the selected business data can be presented in the virtual environment. When user 105 logs out of tabletop device 110 and another user logs into tabletop device 110, the virtual environment can be reconfigured for the other user. When user 105 subsequently logs back into tabletop device 110, the virtual environment on touch display 112 can be reconfigured so that user 105 resumes at the same state as when he had logged out. There may be slight changes to the virtual environment or elements in the virtual environment due to changes to the underlying business data. In some examples, a period of inactivity can result in touch display 112 reducing its brightness to conserve energy in tabletop device 110. When user input is received, tabletop device 110 can increase the brightness of touch display 112 to resume tabletop device 110. Resuming the tabletop device 110 can cause the virtual environment to be updated with new business data in charts 270, 280 and 290.

Figure 3:
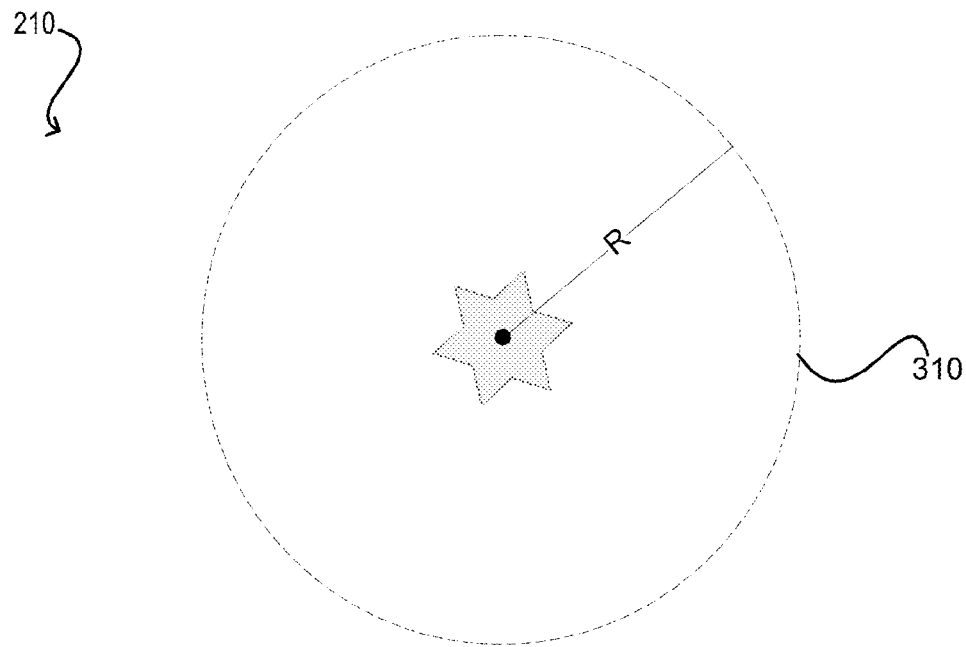
FIG. 3 illustrates a group icon according to one embodiment.

In some embodiments, an icon (e.g., lily pad) from one collection of icons can be moved to another collection of icons. This action can be performed by processor 114 in response to receiving a user input moving the icon on the touch display 112 from one collection to another. The flexibility to rearrange the collection of icons allows user 105 to dynamically group the icons as he or she sees fit rather than being confined to the groupings in the underlying database. FIG. 3 illustrates group icon 210 according to one embodiment. Group icon 210 includes boundary 310 which is an invisible boundary that surrounds group icon 210. Here, boundary 310 is a circle of circumference R however in other embodiments, boundary 310 can be another shape. Functionally, boundary 310 can serve as a boundary which can be used by processor 114 to group icons. When an icon that belongs to a different collection of icons than group icon 210 is moved to a location within boundary 310, processor 114 can associate the icon with group icon 210 so that the icon now belongs to the same collection as group icon 210. Processor 114 can cluster icons that belong to the same group as group icon 210 around group icon 210.

In some embodiments, the boundaries of two group icons can overlap. This can occur when one group icon is within the boundary of another group icon or when the boundaries of two group icons are large enough to overlap. When an icon that is clustered to a group icon other than the two group icons is moved into the overlapping portion, processor 114 can cluster the moved icon with one of the two group icons. In one embodiment, processor 114 can determine which of the two group icons is in closer proximity with the moved icon and cluster the moved icon with the group icon that is nearer. When the icon is moved to a location on touch display 112 that is not within a boundary, no changes are made to the combination of icons. As a result, processor 114 can snap the moved icon back to the group icon that it belongs to, where the moved icon remains clustered around the group icon. Snapping can include moving the moved icon quickly back to the boundary of the group icon that it belongs to followed by a slower motion clustering the moved icon to the group icon.

In some embodiments, processor 114 can modify the data in tables and databases when an icon from one collection of icons is moved to another collection of icons. This can allow user 105 to rearrange the business data in the underlying database or databases according to how the icons are grouped as collections in the virtual environment. For example, processor 114 can move data from group 280 to group 270 when icon 212-B is moved from belonging with group icon 210-B to belonging with group icon 210-A. In other embodiments, moving an icon from one collection to another collection changes the collections in the virtual environment but does not affect the underlying data.

Figure 4:
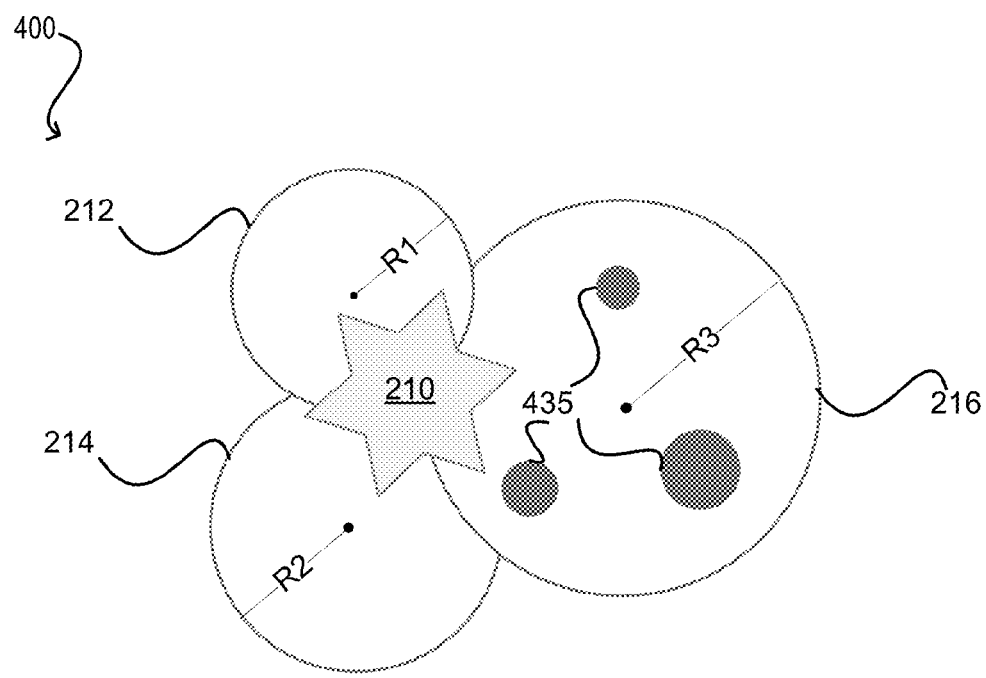
FIG. 4 illustrates a collection of icons according to one embodiment.

FIG. 4 illustrates collection of icons 400 according to one embodiment. Collection 400 can be presented in a virtual environment and includes group icon 210 and icons 212, 214, and 216. As described above, icons 212, 214, and 216 can be configured to graphically represent performance metrics that are used to evaluate the success of an organization. Each performance metric can be based on a group of business data. In some embodiments, processor 114 can dynamically modify the size and visual appearance of icon 212 to convey additional information related to the corresponding performance metric. This can allow user 105 to quickly identify which performance metrics represented in the virtual environment require a closer evaluation based on the appearance of the icons.

In some embodiments, processor 114 can modify the size of an icon to convey information about a first attribute of a corresponding performance metric. In one embodiment, the size of an icon can indicate a change to the performance metric. This allows changes to the performance metric to be easily evaluated by user 105 by simply viewing the size of the icon. In one example, processor 114 can change the size of icon 212 proportionally to a variance percentage parameter associated with the corresponding performance metric. A variance percentage parameter measures the percentage change in the performance metric between an old value and a new value. The performance metric can be periodically updated from an old value to a new value when new business data is periodically introduced into the group of business data. Old values can be stored to monitor the change to the performance metric over time.

In one example, processor 114 can adjust the size of icon 212 according to the absolute value of the variance percentage parameter. Thus, processor 114 can enlarge icon 212 when a large negative change or a large positive change to the performance metric is detected. Enlarging icon 212 when a large change occurs to a performance metric (either positive or negative) can make icon 212 more noticeable. Thus, the larger size icon can serve as a notification to user 105 that the corresponding performance metric may need a closer examination. For instance, if the old performance metric value was 10 and the new performance metric value is 15, then the variance percentage parameter can be calculated by (new_value−old_value)/old_value*100, which would be a positive 50%. Processor 114 can modify icon 212 by making it 50% larger than the default icon size. Enlarging icon 212 can include modifying radius R1 of icon 212. Here, the performance metric corresponding to icon 212 has seen less fluctuation than the performance metric corresponding to icon 214 since icon 212 has a smaller radius than icon 214. The performance metric corresponding to icon 216 has seen the most fluctuation since radius R3 is larger than radius R2 and radius R1.

In some embodiments, processor 114 can modify the appearance of an icon such that the appearance conveys information about a second attribute of the performance metric. For example, the appearance of an icon can represent the health of a corresponding performance metric. Processor 114 can determine the health of the performance metric by comparing the performance metric against a predefined baseline value. The predefined baseline value represents a baseline for defining the success or failure of the performance metric. In one example, a performance metric that is less than the baseline value is considered a failure. In another example, a performance metric that is greater than the baseline value is considered as success. Once the health of the performance metric is determined, processor 114 can alter the visual appearance of the icon in accordance to the attribute.

In one embodiment, the visual appearance of the icon can be modified by processor 114 such that the icon appears healthy or unhealthy. The healthiness and unhealthiness of the icon can be directly related to the health of the performance metric. In some examples, a healthy or unhealthy appearance can depend on the nature element that the icon is representing. In the lily pad icon example, a healthy lily pad can be bright green while an unhealthy lily pad can be dullish green with brown spots or brown depending on the degree of unhealthiness. In other examples, a healthy or unhealthy appearance can depend on the appearance of the element in nature. For instance, a healthy fish can appear vibrant and active while an unhealthy fish can appear dull and sluggish. Here, process 114 can determine the health of performance metrics that are correspond to icons 212, 214, and 216. Icons 212 and 214 are determined to be healthy while icon 216 is determined to be unhealthy. As a result, process 114 can present healthy lily pads for icons 212 and 214. In contrast, process 114 can present an unhealthy lily pad for icon 216. Unhealthy lily pad 216 has brown spots 435. The large size of the lily pad plus the brown spots provides visual cues that the performance metric has experienced a large change and that it is not performing well. The combination of the health of the lily pad plus the size can lead user 105 to further investigate the performance metric. In other embodiments, other attributes of the performance metric can be represented by adjusting the visual appearance of icons 212, 214, and 216.

In some embodiments, processor 114 can also adjust the size and appearance of the group icon to present additional information about the group. The adjustments can be similar to the adjustments for the individual icons. For example if the health of a majority of the icons in the collection are poor, the group icon can also appear unhealthy. The size of the group icon can also be adjusted in a similar fashion.

Figure 5:
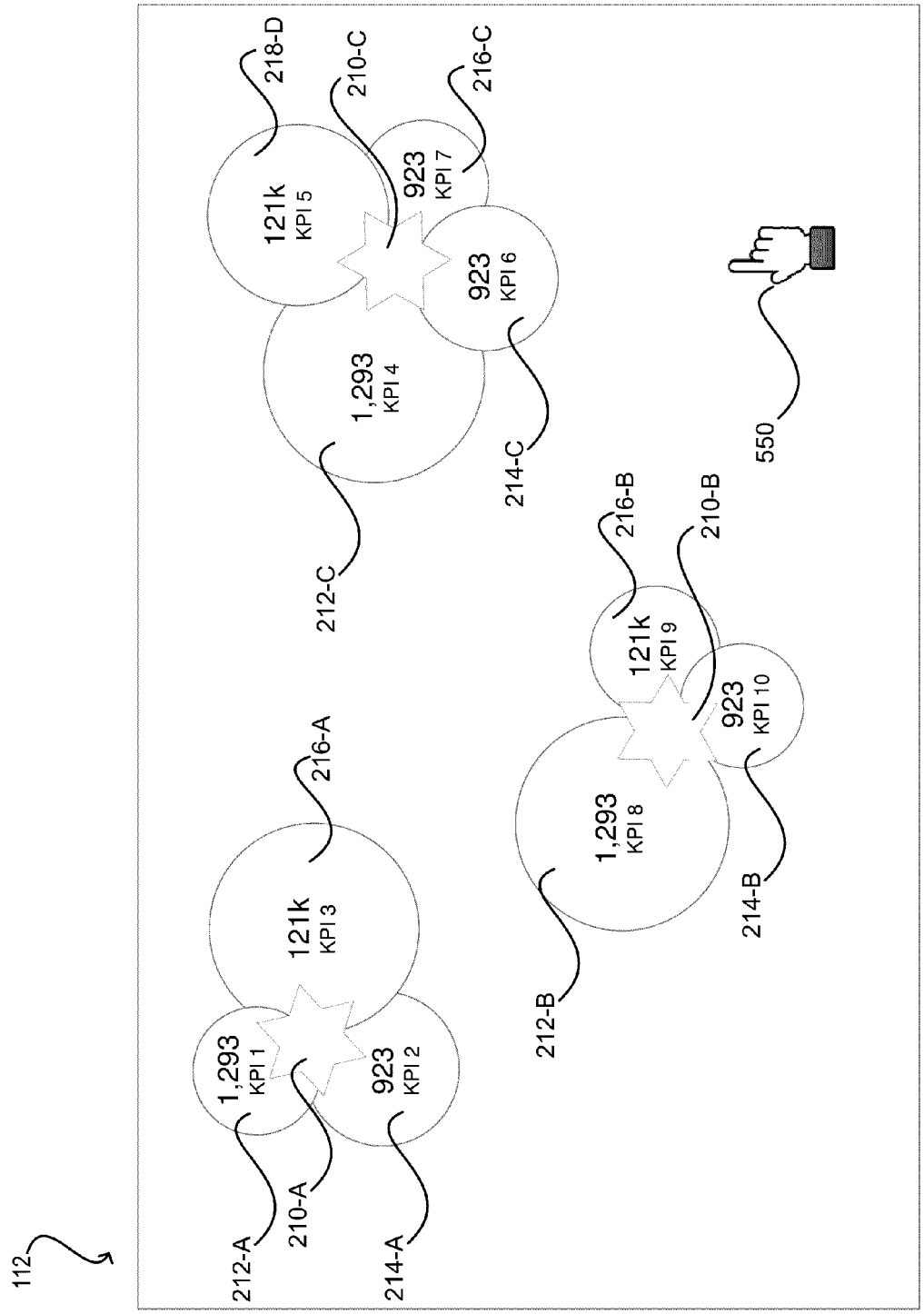
FIG. 5 illustrates a touch display according to one embodiment.

FIG. 5 illustrates touch display 112 according to one embodiment. Touch display 112 is displaying a virtual environment of a pond containing a first collection having lily pads 212-A, 214-A, and 216-A clustered around water lily 210-A, a second collection having lily pads 212-B, 214-B, and 216-B clustered around water lily 210-B, and a third collection having lily pads 212-C, 214-C, 216-C, and 218-C clustered around water lily 210-C. A user can move a collection of lily pads by moving the corresponding water lily. As some point, touch display 112 can detect touch event 550. Touch event 550 can be user 105 touching an area of the virtual environment that is not occupied by a water lily or lily pad. When touch event 550 is detected on touch display 112, processor 114 can display information on each lily pad. The information can include a summary of each performance metric that corresponds with the lily pad. The summary can include an identifier such as a title for the performance metric (e.g., KP1, KP2, KP3, etc.) and a value associated with the performance metric. In some examples, processor 114 can display information for a collection of lily pads when the water lily that corresponds with the collection is touched by user 105. As shown here, identifies and their values are presented on each lily pad. This can provide an overview of the performance of the organization.

Figure 6:
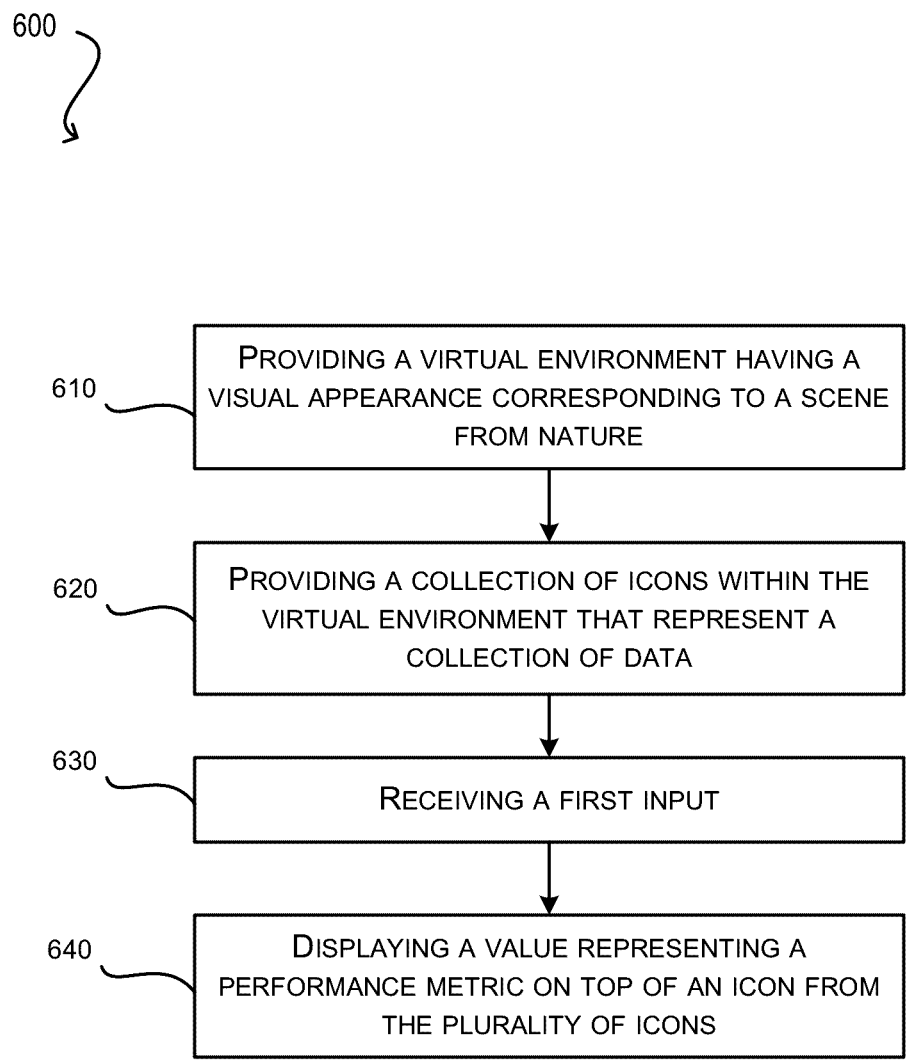
FIG. 6 illustrates a process flow for providing a interacting with a virtual environment according to one embodiment.

FIG. 6 illustrates a process flow for providing a interacting with a virtual environment according to one embodiment. Process 600 can be stored in computer readable medium and executed by a processor such as processor 114 in FIG. 1. Process 600 begins by providing a virtual environment having a visual appearance corresponding to a scene from nature at 610. In one example, the virtual environment can be a body of water, such as a pond. After providing the virtual environment, process 600 continues by providing a collection of icons within the virtual environment that represent a collection of data at 620. The collection of icons can include a plurality of icons that represent a plurality of performance metrics derived from a collection of data. The collection of icons can further include a group icon configured for identifying the plurality of icons. The plurality of icons can cluster around the group icon. After providing the collection of icons, process 600 can receive a first input at 630. The first input can be the user physically contacting a touch display, for example through a tap gesture. In response to the tap gesture, process 600 can display a value representing a performance metric on top of an icon from the plurality of icons at 640. For example, an identifier and a value associated with a performance metric can be displayed on top of an icon corresponding to the performance metric. The value of the performance metric can be correlated to the visual appearance of the icon.

Figure 7:
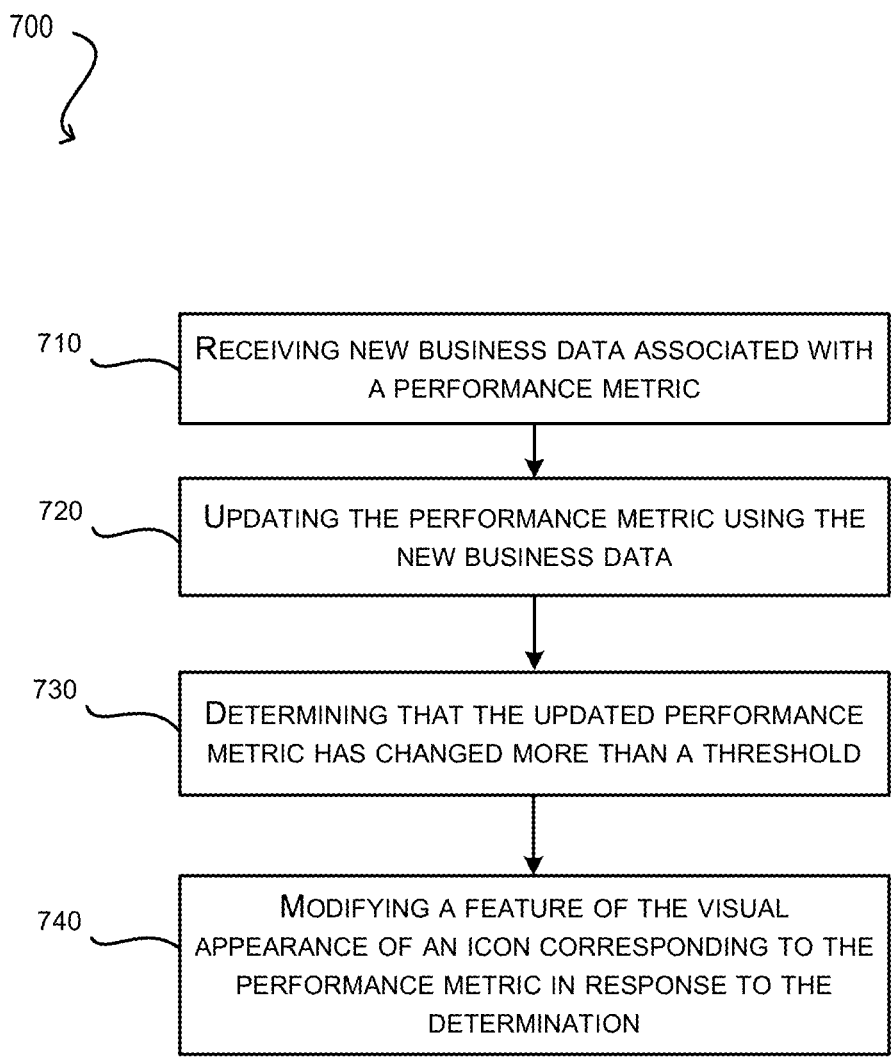
FIG. 7 illustrates a process flow for modifying a feature of the visual appearance of an icon according to one embodiment.

FIG. 7 illustrates a process flow for modifying a feature of the visual appearance of an icon according to one embodiment. The visual appearance of the icon can change when the underlying data of the icon is updated. Process 700 can be stored in computer readable medium and executed by a processor such as processor 114 in FIG. 1. Process 700 begins by receiving new business data associated with a performance metric at 710. For example if the performance metric is customer satisfaction, new customer satisfaction surveys may have been received. Upon receiving the new business data, process 700 continues by updating the performance metric using the new business data at 720. This can include calculating a new value for the performance metric based on the new business data. Process 700 then continues by determining that the updated performance metric has changed more than a threshold at 730. If the performance metric has changed more than a predefined threshold, this can trigger modification of a feature of the visual appearance of the icon. Process 700 then continues by modifying a feature of the visual appearance of an icon corresponding to the performance metric in response to the determination at 740. In some examples, the feature can be the size, shape, appearance, or other visual trait associated with the icon. By only modifying the visual appearance only when the change is more than a predefined threshold, the appearance of the icon will appear more stable.

Figure 8:
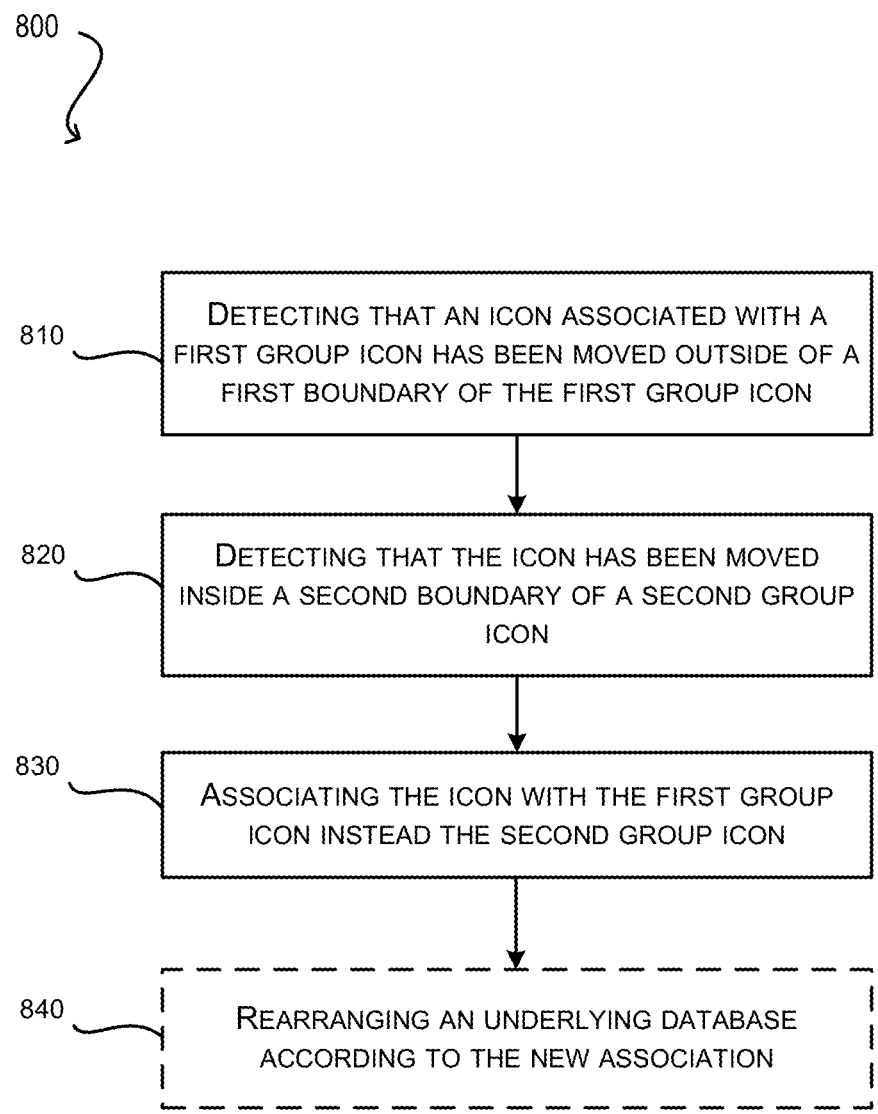
FIG. 8 illustrates a process flow for moving icons between collections according to one embodiment.

FIG. 8 illustrates a process flow for moving icons between collections according to one embodiment. Process 800 can be stored in computer readable medium and executed by a processor such as processor 114 in FIG. 1. Process 800 begins by detecting that an icon associated with a first group icon has been moved outside of a first boundary of the first group icon at 810. The icon and the first group icon can both belong to a first collection of icons that represent a first collection of data where the first boundary describes the boundary in which the first collection of icons reside. When the icon moves outside of the first boundary, there is a possibility that association between the icon and the first group icon will be replaced by an association between the icon and a second group icon. Process 800 then continues by detecting that the icon has been moved inside a second boundary of a second group icon at 820. The second boundary can describe the boundary in which icons in a second collection of icons reside. By moving the icon from the within the first boundary to within the second boundary, process 800 can interpret the action as a request to transfer the icon's association from the first group icon to the second group icon. At 830, process 800 continues by associating the icon with the first group icon instead of the second group icon. By associating the icon with the second group icon, the icon can now cluster around the second group icon. In some examples, associating the icon with the second group icon can cause the icon to move with the second group icon when an instruction is received to move the second group icon. Optionally, process 800 can also rearrange an underlying database according to the new association at 840. Rearranging the underlying database can include moving data associated with the icon from a first collection of data to a second collection of data that is being represented by the second collection of icons. In some examples, process 800 can examine the first collection of data to determine if there is any data that is no longer needed due to the move of the first icon. This data can be deleted from the first collection of data. Similarly, process 800 can examine the second collection of data to determine if there is any data that needs to be added from the first collection of data due to the move of the first icon. This data can be added to the second collection of data.

Figure 9:
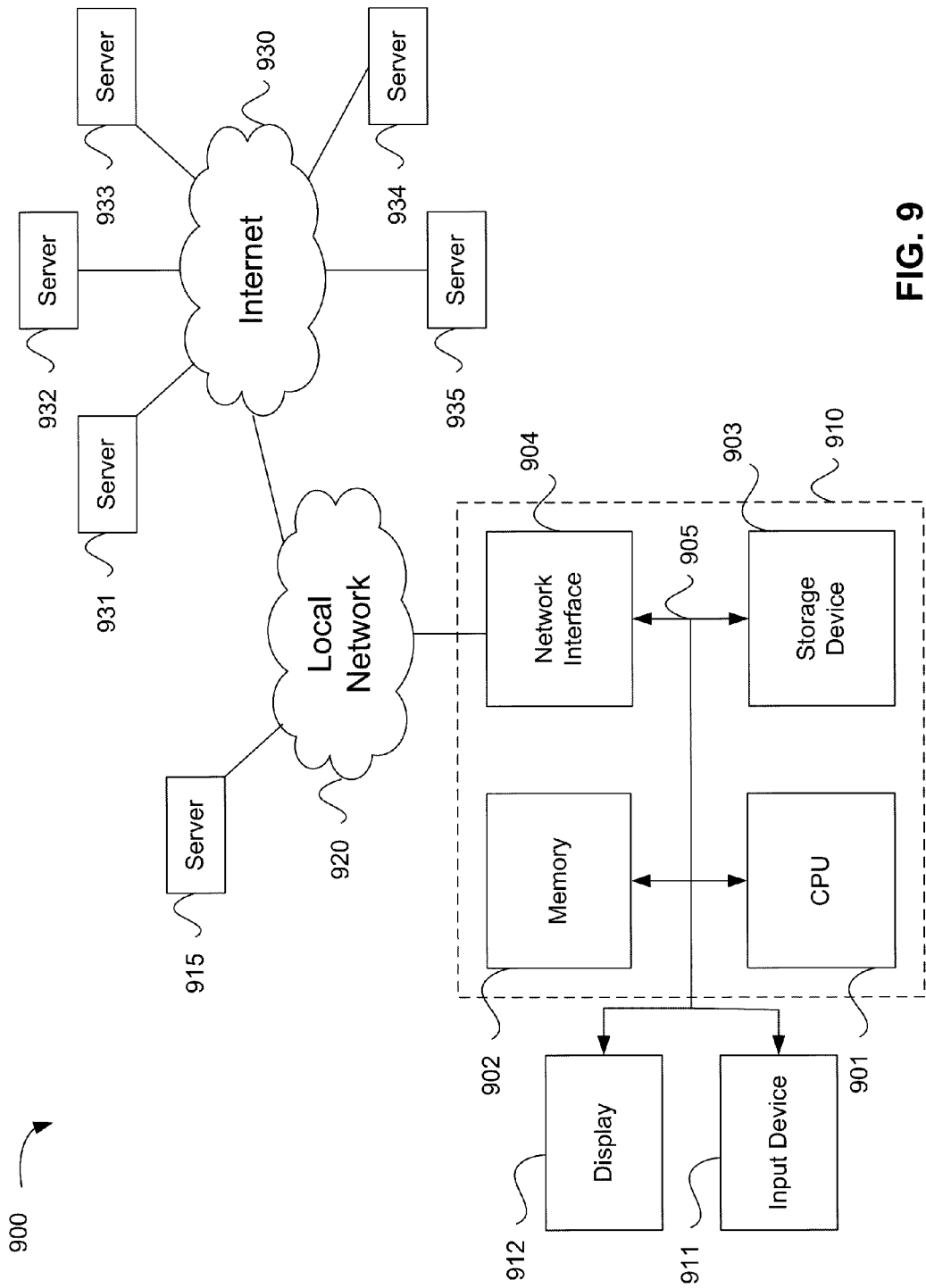
FIG. 9 illustrates an exemplary computer system according to one embodiment.

An exemplary computer system 900 is illustrated in FIG. 9. Computer system 910 includes bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method for presenting a collection of data, comprising:
    providing, by a processor, a virtual environment having a visual appearance corresponding to a scene from nature;
    processing a first collection of data from a first chart in a first database table of an underlying database;
    presenting, by the processor, a first collection of icons within the virtual environment that represent the first collection of data, the first collection of icons including a plurality of icons that represent a plurality of performance metrics derived from the first collection of data and a first group icon,
    wherein the first group icon includes a first boundary and the first collection of icons cluster around the first group icon within the first boundary to provide a visual indication that the first collection of icons are generated from the first collection of data in the first chart of the first database table;
    presenting, by the processor, a second collection of icons within the virtual environment that represent a second collection of data from a second chart in a second database table of the underlying database, wherein the second collection of icons are generated from the second collection of data in the second chart of the second database table;
    detecting, in response to a first input, movement of a second icon from the second collection of icons clustered around the second group icon to a location within the first boundary of the first group icon in the virtual environment;
    clustering the second icon with the first group icon in the virtual environment; and
    modifying the first and second collections of data in the first and second charts of the first and second database tables of the underlying database according to how the first and second collection of icons are grouped in the virtual environment in response to the movement of the second icon,
    wherein modifying the first and second collections of data comprises relocating data represented by the second icon from the second collection of data in the second chart of the second database table to the first collection of data in the first chart of the first database table.

2. The computer-implemented method of claim 1, wherein the virtual environment is displayed on a touch display.

3. The computer-implemented method of claim 1, wherein the first input is representative of selecting an area within the virtual environment that is unoccupied by the first collection of icons.

4. The computer-implemented method of claim 1 further comprising dynamically adjusting the size of each of the plurality of icons in proportion to a variance percentage parameter associated with the corresponding performance metric in response to a change in the performance metric.

5. The computer-implemented method of claim 4 wherein the size of each of the plurality of icons is dynamically adjusted such that icons having a variance percentage parameter associated with a larger change in the performance metric appear larger than icons having a variance percentage parameter associated with a smaller change in the performance metric.

6. The computer-implemented method of claim 1, further comprising dynamically adjusting the visual appearance of the plurality of icons according to a health parameter associated with the corresponding performance metric in response to a change in the performance metric.

7. A non-transitory computer readable storage medium storing one or more programs, the one or more programs comprising instructions for:
    providing a virtual environment having a visual appearance corresponding to a scene from nature;
    processing a first collection of data from a first chart in a first database table of an underlying database;
    presenting a first collection of icons within the virtual environment that represent the first collection of data, the first collection of icons including a plurality of icons that represent a plurality of performance metrics derived from the first collection of data and a first group icon,
    wherein the first group icon includes a first boundary and the first collection of icons cluster around the first group icon within the boundary to provide a visual indication that the first collection of icons are generated from the first collection of data in the first chart of the first database table;
    presenting, by the processor, a second collection of icons within the virtual environment that represent a second collection of data from a second chart in a second database table of the underlying database, wherein the second collection of icons are generated from the second collection of data in the second chart of the second database table;
    detecting, in response to a first input, movement of a second icon from the second collection of icons clustered around the second group icon to a location within the first boundary of the first group icon in the virtual environment;
    clustering the second icon with the first group icon in the virtual environment; and
    modifying the first and second collection of data in the first and second charts of the first and second database tables of the underlying database according to how the first and second collection of icons are grouped in the virtual environment in response to the movement of the second icon,
    wherein modifying the first and second collections of data comprises relocating data represented by the second icon from the second collection of data in the second chart of the second database table to the first collection of data in the first chart of the first database table.

8. The non-transitory computer readable storage medium of claim 7, wherein the virtual environment is displayed on a touch display.

9. The non-transitory computer readable storage medium of claim 7, wherein the first input is representative of selecting an area within the virtual environment that is unoccupied by the first collection of icons.

10. The non-transitory computer readable storage medium of claim 7 further comprising dynamically adjusting the size of each of the plurality of icons in proportion to a variance percentage parameter associated with the corresponding performance metric in response to a change in the performance metric.

11. The non-transitory computer readable storage medium of claim 7 further comprising dynamically adjusting the visual appearance of the plurality of icons according to a health parameter associated with the corresponding performance metric in response to a change in the performance metric.

12. A computer implemented system for presenting a collection of data, the system comprising:

one or more computer processors; and a non-transitory computer-readable storage medium comprising instructions, which when executed, control the one or more computer processors to be configured for:

providing a virtual environment having a visual appearance corresponding to a scene from nature;

processing a first collection of data from a first chart in a first database table of an underlying database;

presenting a first collection of icons within the virtual environment that represent the first collection of data, the first collection of icons including a plurality of icons that represent a plurality of performance metrics derived from the first collection of data and a first group icon, wherein the first group icon includes a first boundary and the first collection of icons cluster around the first group icon within the first boundary to provide a visual indication that the first collection of icons are generated from the first collection of data in the first chart of the first database table;

presenting a second collection of icons within the virtual environment that represent a second collection of data from a second chart in a second database table of the underlying database, wherein the second collection of icons are generated from the second collection of data in the second chart of the second database table;

detecting, in response to a first input, movement of a second icon from the second collection of icons clustered around the second group icon to a location within the first boundary of the first group icon in the virtual environment;

clustering the second icon with the first group icon in the virtual environment; and modifying the first and second collections of data in the first and second charts of the first and second database tables of the underlying database according to how the first and second collection of icons are grouped in the virtual environment in response to the movement of the second icon, wherein modifying the first and second collections of data comprises relocating data represented by the second icon from the second collection of data in the second chart of the second database table to the first collection of data in the first chart of the first database table.

13. The computer implemented system of claim 12, wherein the first input is representative of selecting an area within the virtual environment that is unoccupied by the first collection of icons.

14. The computer implemented system of claim 12 further comprising dynamically adjusting the size of each of the plurality of icons in proportion to a variance percentage parameter associated with the corresponding performance metric in response to a change in the performance metric.

15. The computer implemented system of claim 12 further comprising dynamically adjusting the visual appearance of the plurality of icons according to a health parameter associated with the corresponding performance metric in response to a change in the performance metric.

* * * * *